United States Patent
Herken et al.

(10) Patent No.: US 6,529,193 B1
(45) Date of Patent: Mar. 4, 2003

(54) SYSTEM AND METHOD FOR GENERATING PIXEL VALUES FOR PIXELS IN AN IMAGE USING STRICTLY DETERMINISTIC METHODOLOGIES FOR GENERATING SAMPLE POINTS

(75) Inventors: Rolf Herken, Berlin (DE); Martin Grabenstein, Munich (DE)

(73) Assignee: Mental Images GmbH & Co. KG, Berlin (DE)

( * ) Notice: Subject to any disclaimer, the term of this patent is extended or adjusted under 35 U.S.C. 154(b) by 0 days.

(21) Appl. No.: 08/880,418

(22) Filed: Jun. 23, 1997

Related U.S. Application Data
(60) Provisional application No. 60/022,011, filed on Jun. 25, 1996.

(51) Int. Cl.[7] .............................................. G06T 15/50
(52) U.S. Cl. .................................................... 345/426
(58) Field of Search ................................ 345/419, 426, 345/591, 589

(56) References Cited

U.S. PATENT DOCUMENTS

| | | | | |
|---|---|---|---|---|
| 5,790,442 A | * | 8/1998 | Ninomiya et al. | 364/733 |
| 5,872,725 A | * | 2/1999 | Ninomiya et al. | 364/717.01 |
| 6,058,377 A | * | 5/2000 | Traub et al. | 705/36 |

OTHER PUBLICATIONS

R. Cook, Distributed Ray Tracing, Computer Graphics 18 (3) 137–145 Jul. 1984.

R Cook, Stochastic Sampling And Distributed Ray Tracing, in: A. S. Glasner (ed), An Introduction To Ray Tracing, Academic Press, London, 1989.

J. T. Kajiya, The rendering equation, Computer Graphics 20 (4), 143, 1986.

F. Sillion, Radiosity& Global Illumnation, Morgan Kaufman (San Francisco, 1994).

H. Niederreiter, Random Number Generation And Quasi–Monte Carlo Methods, CBMS–NSF Regiona Converence Series in Applied Mathematics, vol. 63, Soc. Industrial & Applied Mathematics, 1992.

D. Mitchel, Ray tracing and irregularities of distribution, in: Proc Third Eurographics Workshop on Rendering, Bristol, pp, 61–69, May 1992.

S. Heinrich, Quasi–Monte Carlo Methods In Computer Graphics, part 1: The QMC–Buffer Technical Report KL 243/94, Dept Computer Science, Univ. Kaiserslautern, 1994.

A. Keller, A Quasi–Monte Carlo Algorithm for the Global Illumnation Problem in the Radiosity Setting, in: Lecture notes in Statistics 106, H. Niederreiter and P. Shiue, eds., Springer Verlat, Berlin, Heidelberg, 1995.

(List continued on next page.)

*Primary Examiner*—Thu Nguyen
(74) *Attorney, Agent, or Firm*—Richard V. Jordan

(57) ABSTRACT

A computer graphics system and a method for generating pixel values in an image of objects using strictly-deterministic low-discrepancy sequences as sample points for evaluating integrals which are used to simulate a number of computer graphic techniques including soft shadows, simulation of depth of field, motion blur, jittering, and global illumination. Unlike the random numbers used in connection with the Monte Carlo technique, the low discrepancy sequences ensure that the sample points are evenly distributed over a respective region or time interval, thereby reducing clumping of such sample points. The invention facilitates the generation of images of improved quality when using the same number of sample points at the same computational cost as in the Monte Carlo technique.

10 Claims, 9 Drawing Sheets

OTHER PUBLICATIONS

A. Glassnere, Principles of Digital Image Synthesis, Morgan Kaufmann, San Francisco, CA 1995.

J. M. Hammersley, Monte Carlo Methods, Methuen, London, 1964.

E. Lafortune, Mathematical Methods and Monte Carlo Algorithms for Physically Based Rendering, PhD thesis, Latholieke Univ. Leuven, Belgium, 1996.

P. Shirkey, Monte Carlo Simulation And Integration, Siggraph Course Notes 18 (Global Illumination) 1992.

J. Halton, Numerische Mathematik 2 (1960) pp. 84–90.

G. Pages, Van der Corput sequences, Kakutani transforms and one–dimensional numerical integration, J. Comput. Application. Math., 44 (1992) pp. 21–39.

J. Stuckmeier, Fast generation of low–discrepancy sequences, J. Comput. Applied Math. 61 (1995) pp. 29–41.

S. Heinrich, Quasi–Monte Carlo Methods in Computer Graphics, part II: The Radiance Equation Technical Report KL 243/94, Univ. Kaiserslautern, 1994.

\* cited by examiner

FIG. 2

100. COMPUTER GRAPHICS SYSTEM 10 IDENTIFIES POINT IN SCENE FOR WHICH PIXEL VALUE IS TO BE GENERATED.

101. COMPUTER GRAPHICS SYSTEM 10 GENERATES "N" ELEMENTS OF A TWO-DIMENSIONAL HALTON SEQUENCE REPRESENTING POINTS ON THE LIGHT SOURCE WHICH ARE TO BE USED IN APPROXIMATION OF THE PIXEL VALUE TO PROVIDE FOR APPEARANCE OF SOFT SHADOWS IN IMAGE INCLUDING PIXEL WHOSE PIXEL VALUE IS BEING GENERATED.

102. FOR EACH OF THE "N" ELEMENTS OF THE TWO-DIMENSIONAL HALTON SEQUENCE GENERATED IN STEP 101, COMPUTER GRAPHICS SYSTEM 10 GENERATES A VALUE FOR THE SOFT SHADOWS ILLUMINATION FUNCTION (EQUATION (7)), USING THE ELEMENT OF THE HALTON SEQUENCE AS THE COORDINATES OF THE POINT ON THE LIGHT SOURCE.

103. COMPUTER GRAPHICS SYSTEM 10 GENERATES PIXEL VALUE FOR POINT IN SCENE AS AVERAGE OF THE VALUES GENERATED IN STEP 102.

FIG. 3

110. COMPUTER GRAPHICS SYSTEM 10 IDENTIFIES POINT IN SCENE FOR WHICH PIXEL VALUE IS TO BE GENERATED.

111. COMPUTER GRAPHICS SYSTEM 10 GENERATES "N" ELEMENTS OF A TWO-DIMENSIONAL HALTON SEQUENCE REPRESENTING POINTS (X',Y') ON LENS WHICH ARE TO BE USED IN APPROXIMATION OF THE PIXEL VALUE TO PROVIDE SIMULATION OF DEPTH OF FIELD FOR THE LENS IN IMAGE INCLUDING PIXEL WHOSE PIXEL VALUE IS BEING GENERATED.

112. FOR EACH OF THE "N" ELEMENTS OF THE TWO-DIMENSIONAL HALTON SEQUENCE GENERATED IN STEP 111, COMPUTER GRAPHICS SYSTEM 10 GENERATES A VALUE FOR THE LUMINANCE FUNCTION L-(BAR) (X,Y,X',Y'), USING THE ELEMENT OF THE HALTON SEQUENCE AS THE COORDINATES OF THE POINT ON THE LENS (X',Y').

113. COMPUTER GRAPHICS SYSTEM 10 GENERATES A PIXEL VALUE FOR POINT IN SCENE AS THE AVERAGE OF THE VALUES GENERATED IN STEP 112.

FIG. 4

120. COMPUTER GRAPHICS SYSTEM 10 IDENTIFIES POINT IN SCENE FOR WHICH PIXEL VALUE IS TO BE GENERATED.

↓

121. COMPUTER GRAPHICS SYSTEM 10 GENERATES "N" ELEMENTS OF A ONE-DIMENSIONAL HALTON SEQUENCE REPRESENTING POINTS IN TIME "T" WHICH ARE TO BE USED IN APPROXIMATION OF THE PIXEL VALUE TO PROVIDE SIMULATION OF MOTION BLUR IN IMAGE INCLUDING PIXEL WHOSE PIXEL VALUE IS BEING GENERATED.

↓

122. FOR EACH OF THE "N" ELEMENTS OF THE ONE-DIMENSIONAL HALTON SEQUENCE GENERATED IN STEP 121, COMPUTER GRAPHICS SYSTEM 10 GENERATES A VALUE FOR THE LUMINANCE FUNCTION $L(X,Y,T)$, USING THE ELEMENT OF THE HALTON SEQUENCE AS THE POINT IN TIME "T" OVER WHICH MOTION BLUR IS TO BE GENERATED.

↓

123. COMPUTER GRAPHICS SYSTEM 10 GENERATES A PIXEL VALUE FOR POINT IN SCENE AS THE AVERAGE OF THE VALUES GENERATED IN STEP 122.

FIG. 5

130. COMPUTER GRAPHICS SYSTEM 10 IDENTIFIES IMAGE REGION FOR WHICH PIXEL VALUES ARE TO BE GENERATED

131. COMPUTER GRAPHICS SYSTEM 10 GENERATES "N" ELEMENTS OF A TWO-DIMENSIONAL HALTON SEQUENCE REPRESENTING POINTS "(X,Y)" ON IMAGE REGION FOR WHICH PIXEL VALUES ARE TO BE GENERATED, WHICH POINTS ARE TO BE USED IN APPROXIMATION OF PIXEL VALUES TO PROVIDE SIMULATION OF JITTERING FOR THE PIXELS IN THE IMAGE REGION IDENTIFIED IN STEP 130.

132. FOR EACH OF THE PIXELS CONTAINED IN THE IMAGE REGION, IDENTIFY THE POINTS "(X,Y)" IDENTIFIED BY THE TWO-DIMENSIONAL HALTON SEQUENCE GENERATED IN STEP 131 THAT ARE CONTAINED WITHIN THE AREA OF THE PIXEL.

(A)

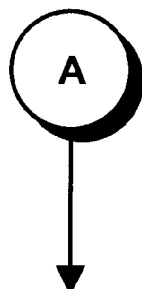

*FIG. 5A*

133. FOR EACH OF THE POINTS IDENTIFIED IN STEP 132, COMPUTER GRAPHICS SYSTEM 10 GENERATES A VALUE FOR THE COLOR FUNCTION L(X,Y) USING THE ELEMENT OF THE HALTON SEQUENCE AS THE POINT (X,Y) OVER WHICH JITTERING IS TO BE GENERATED.

134. FOR EACH PIXEL IDENTIFIED IN STEP 132, COMPUTER GRAPHICS SYSTEM 10 GENERATES PIXEL VALUE FOR THE PIXEL AS THE AVERAGE OF THE COLOR FUNCTION VALUES GENERATED IN STEP 133.

FIG. 6

140. COMPUTER GRAPHICS SYSTEM 10 SPECIFIES KERNEL K(X,Y) FOR INTEGRAL FOR RENDERING EQUATION (EQUATION (15)) FOR POINT "X" AND DIRECTION "W" IN SCENE FOR WHICH RADIANCE VALUE L(X,W) IS TO BE GENERATED

↓

141. A VALUE FOR "N," THE NUMBER OF ESTIMATORS TO BE GENERATED, IS SELECTED AND LOADED INTO A COUNTER

↓

142. COMPUTER GRAPHICS SYSTEM 10 ESTABLISHES AND INITIALIZES A RADIANCE VALUE ACCUMULATOR

↓

143. COMPUTER GRAPHICS SYSTEM ESTABLISHES AND INITIALIZES A CURRENT ESTIMATOR ACCUMULATOR

↓

144. COMPUTER GRAPHICS SYSTEM 10 GENERATES A VALUE FOR THE EMITTED RADIANCE TERM Le(X,W) (EQUATION (15)) AND ADDS VALUE TO CURRENT ESTIMATOR ACCUMULATOR

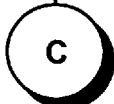

*FIG. 6A*

145. COMPUTER GRAPHICS SYSTEM 10 GENERATES NEXT COMPONENTS OF ELEMENT OF MULTI- DIMENSIONAL HALTON SEQUENCE

146. COMPUTER GRAPHICS SYSTEM 10 USES K(X,Y) AND COMPONENTS OF MULTI-DIMENSIONAL HALTON SEQUENCE GENERATED IN STEP 145 TO GENERATE VALUE FOR TERM OF ESTIMATOR (EQUATION (27))

147. COMPUTER GRAPHICS SYSTEM 10 DETERMINES WHETHER VALUE GENERATED IN STEP 146 IS ZERO —YES

NO

148. COMPUTER GRAPHICS SYSTEM 10 ADDS VALUE GENERATED IN STEP 146 TO CURRENT ESTIMATOR ACCUMULATOR

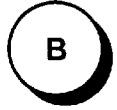

SYSTEM AND METHOD FOR GENERATING PIXEL VALUES FOR PIXELS IN AN IMAGE USING STRICTLY DETERMINISTIC METHODOLOGIES FOR GENERATING SAMPLE POINTS

This application claims the benefit of Provisional application Ser. No. 60/022,011 filed Jun. 25, 1996.

FIELD OF THE INVENTION

The invention relates generally to the field of computer graphics, and more particularly to systems and methods for generating pixel values for pixels in the image.

BACKGROUND OF THE INVENTION

In computer graphics, a computer is used to generate digital data that represents the projection of surfaces of objects in, for example, a three-dimensional scene, illuminated by one or more light sources, onto a two-dimensional image plane, to simulate the recording of the scene by, for example, a camera. The camera may include a lens for projecting the image of the scene onto the image plane, or it may comprise a pinhole camera in which case no lens is used. The two-dimensional image is in the form of an array of picture elements (which are variable termed "pixels" or "pels"), and the digital data generated for each pixel represents the color and luminance of the scene as projected onto the image plane at the point of the respective pixel in the image plane. The surfaces of the objects may have any of a number of characteristics, including shape, color, specularity, texture, and so forth, which are preferably rendered in the image as closely as possible, to provide a realistic-looking image.

Generally, the contributions of the light reflected from the various points in the scene to the pixel value representing the color and intensity of a particular pixel are expressed in the form of the one or more integrals of relatively complicated functions. Since the integrals used in computer graphics generally will not have a closed-form solution, numerical methods must be used to evaluate them and thereby generate the pixel value. Typically, a conventional "Monte Carlo" method has been used in computer graphics to numerically evaluate the integrals. Generally, in the Monte Carlo method, to evaluate an integral $$\langle f \rangle = \int_0^1 f(x)\, dx, \quad (1)$$

where f(x) is a real function on the real numerical interval from zero to 1, inclusive, first a number "N" statistically-independent random numbers $x_i$, i=1, . . . , N, are generated over the interval. The random numbers $x_i$ are used as sample points for which sample values $f(x_i)$ are generated for the function f(x), and an estimate $\bar{f}$ for the integral is generated as $$\langle f \rangle \approx \bar{f} = \frac{1}{N}\sum_{i=1}^{N} f(x_i). \quad (2)$$

As the number of random numbers used in generating the sample points $f(x_i)$ increases, the value of the estimate $\bar{f}$ will converge toward the actual value of the integral $\langle f \rangle$. Generally, the distribution of estimate values that will be generated for various values of "N," that is, for various numbers of samples, of being normal distributed around the actual value with a standard deviation σ which can be estimated by $$\sigma = \sqrt{\frac{1}{N-1}(\overline{f^2} - \bar{f}^2)}, \quad (3)$$

if the values $x_i$ used to generate the sample values $f(x_i)$ are statistically independent, that is, if the values $x_i$ are truly generated at random.

Generally, it has been believed that random methodologies like the Monte Carlo method are necessary to ensure that undesirable artifacts, such as Moire patterns and aliasing and the like, which are not in the scene, will not be generated in the generated image. However, several problems arise from use of the Monte Carlo method in computer graphics. First, since the sample points $x_i$ used in the Monte Carlo method are randomly distributed, they may not be generally evenly distributed across the interval, but instead may clump in various regions over the interval over which the integral is to be evaluated. Accordingly, depending on the set of random numbers which are generated, in the Monte Carlo method for significant portions of the interval there may be no sample points $x_i$ for which sample values $f(x_i)$ are generated. In that case, the error can become quite large. In the context of generating a pixel value in computer graphics, the pixel value that is actually generated using the Monte Carlo method may not reflect some elements which might otherwise be reflected if the sample points $x_i$ were guaranteed to be generally evenly distributed over the interval. This problem can be alleviated somewhat by dividing the interval into a plurality of sub-intervals, but it is generally difficult to determine a priori the number of sub-intervals into which the interval should be divided, and, in addition, in a multi-dimensional integration region (which would actually be used in computer graphics, instead of the one-dimensional interval described here) the partitioning of the region into sub-regions of equal size can be quite complicated.

In addition, since the method makes use of random numbers, the error $|\bar{f} - \langle f \rangle|$ (where $|x|$ represents the absolute value of the value "x") between the estimate value $\bar{f}$ and actual value $\langle f \rangle$ is probabilistic, and, since the error values for various values of "N" are normal distributed around the actual value $\langle f \rangle$, only sixty-eight percent of the estimate values $\bar{f}$ that might be generated are guaranteed to lie within one standard deviation of the actual value $\langle f \rangle$.

Furthermore, as is clear from equation (3), the standard deviation a decreases with increasing numbers of samples N, proportional to the reciprocal of square root of "N" (that is, $1/\sqrt{N}$). Thus, if it is desired to reduce the statistical error by a factor of two, it will be necessary to increase the number of samples N by a factor of four, which, in turn, increases the computational load that is required to generate the pixel values, for each of the numerous pixels in the image.

Additionally, since the Monte Carlo method requires random numbers, an efficient mechanism for generating random numbers is needed. Generally, digital computers are provided with so-called "random number" generators, which are computer programs which can be processed to generate a set of numbers that are approximately random. Since the random number generators use deterministic techniques, the numbers that are generated are not truly random. However, the property that subsequent random numbers from a random number generator are statistically independent should be maintained by deterministic implementations of pseudo-random numbers on a computer.

SUMMARY OF THE INVENTION

The invention provides a new and improved computer graphics system and method for generating pixel values for pixels in the image using a strictly deterministic methodology for generating sample points for use in evaluating integrals defining aspects of the image.

In brief summary, the computer graphics system in accordance with the invention generates pixel values for pixels in an image of objects in a scene, using strictly-deterministic low-discrepancy sequences, illustratively Halton sequences, as sample points for evaluating integrals which are used to simulate a number of computer graphic techniques, including (1) soft shadows generated for scenes illuminated by a light source having a finite extent, such as a disk, as opposed to a point light source;

(2) Simulation of depth of field;

(3) motion blur;

(4) jittering; and (5) global illumination.

The computer graphics system uses the low-discrepancy sequences:

(1) in connection with soft shadows, to generate sample points over the finite extent of the light source illuminating the scene;

(2) in connection with simulation of depth of field, to generate sample points over the area of the lens between the scene and the image;

(3) in connection with motion blur, to generate sample points over a time interval over which motion blur is to be simulated for moving objects in the scene;

(4) in connection with jittering, to generate jittered sample points over an image or a plurality of contiguous pixels; and (5) in connection with global illumination, to generate sample points for use in a strictly-deterministic Russian roulette methodology for generating estimators for use in simulating global illumination.

Unlike the random numbers used in connection with the Monte Carlo technique, the low discrepancy sequences ensure that the sample points are evenly distributed over a respective region or time interval, thereby reducing error in the image which can result from clumping of such sample points which can occur in the Monte Carlo technique. In particular, the invention facilitates the generation of images of improved quality when using the same number of sample points at the same computational cost as in the Monte Carlo technique.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 2 through 6 are flow-charts useful in understanding the operations of the computer graphics system depicted in FIG. 1, in accordance with the invention.

DETAILED DESCRIPTION OF AN ILLUSTRATIVE EMBODIMENT

The invention provides a computer graphic system and method for generating pixel values for pixels in an image of a scene, which makes use of a strictly-deterministic methodology for generating sample points for use in generating sample values for evaluating the integral or integrals whose function(s) represent the contributions of the light reflected from the various points in the scene to the respective pixel value, rather than the random or pseudo-random Monte Carlo methodology which has been used in the past. The strictly-deterministic methodology ensures a priori that the sample points will be generally evenly distributed over the interval or region over which the integral(s) is (are) to be evaluated in a low-discrepancy manner.

Figure 1:
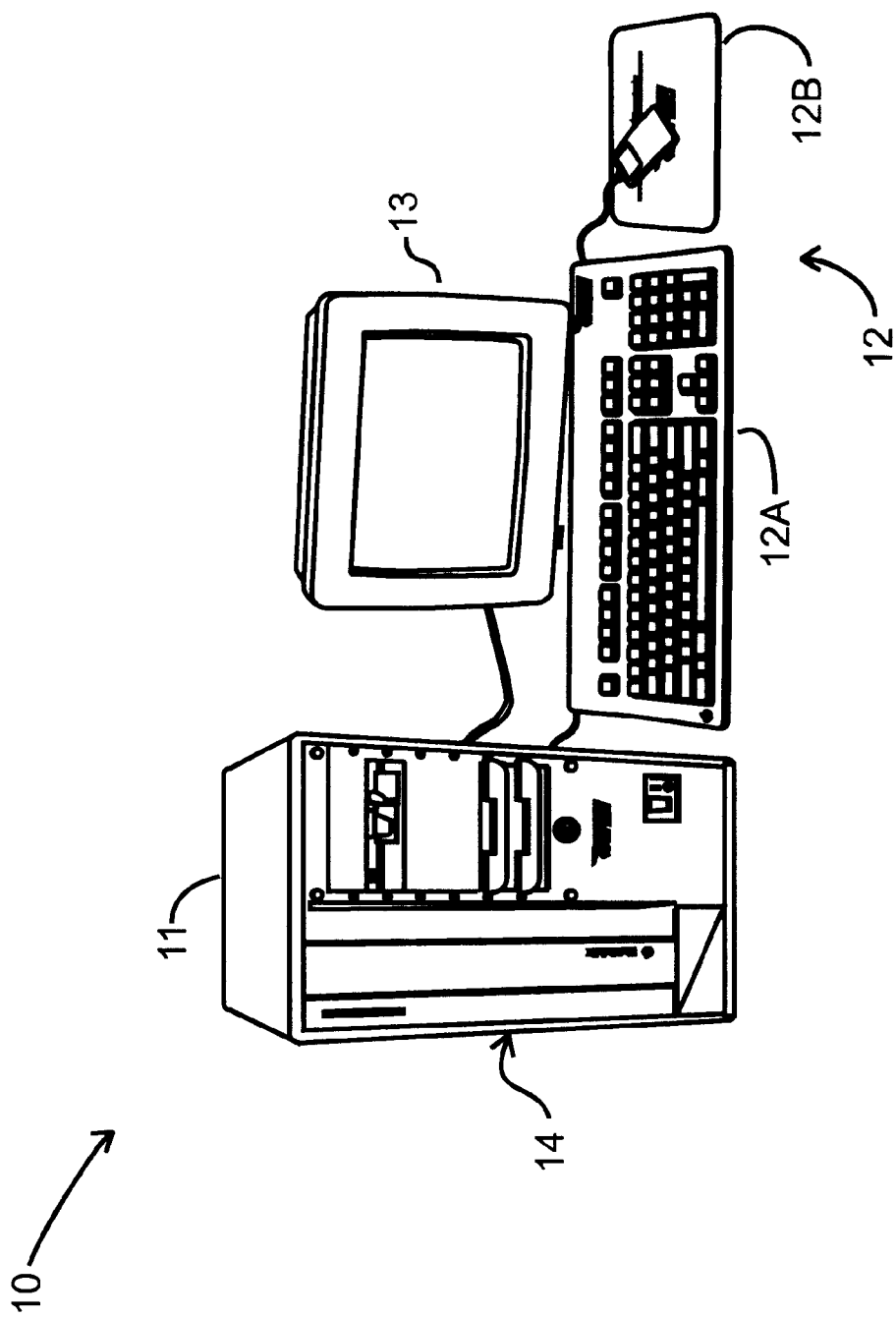
FIG. 1 depicts a computer graphics system constructed in accordance with the invention.

FIG. 1 attached hereto depicts an illustrative computer system 10 that makes use of such a strictly deterministic methodology. With reference to FIG. 1, the computer system 10 in one embodiment includes a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, one or more processor, memory and mass storage devices, such as disk and/or tape storage elements (not separately shown), which perform processing and storage operations in connection with digital data provided thereto. The operator input element(s) 12 are provided to permit an operator to input information for processing. The video display device 13 is provided to display output information generated by the processor module 11 on a screen 14 to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 includes one or more network ports, generally identified by reference numeral 14, which are connected to communication links which connect the computer system 10 in a computer network. The network ports enable the computer system 10 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

As noted above, the computer graphics system 10 generates pixel values for pixels in an image of a scene, which makes use of a strictly-deterministic methodology for selecting sample points used to generate sample values which are then used in evaluating the integral or integrals whose function(s) is represent the contributions of the light reflected from the various points in the scene to the respective pixel value. In one particular embodiment, the strictly-deterministic methodology used by the computer graphics system 10 provides a low-discrepancy sample point sequence which ensures, a priori, that the sample points are generally evenly distributed throughout the region over which the respective integrals are being evaluated. In one embodiment, the sample points that are used are based on a scaled Halton sequence. See, for example, J. H. Halton, *Numerische Mathematik*, Vol. 2, pp. 84–90 (1960) and W. H. Press, et al., Numerical Recipes in Fortran (2d Edition) page 300 (Cambridge University Press, 1992). In a Halton sequence generated for number base "p," where base "p" is a selected prime number, the "k-th" value of the sequence, represented by $H_p^k$ is generated by (1) writing the value "k" as a numerical representation of the value in the selected base "p," thereby to provide a representation for the value as $D_M D_{M-1} \ldots D_2 D_1$, where $D_m$ (m=1, 2, . . . , M) are the digits of the representation, and (2) putting a radix point (corresponding to a decimal point for numbers written in base ten) at the end of the representation $D_M D_{M-1} \ldots D_2 D_1$ written in step (1) above, and reflecting the digits around the radix point to provide $0.D_1 D_2 \ldots D_{M-1} D_M$, which corresponds to $H_p^k$.

It will be appreciated that, regardless of the base "p" selected for the representation, for any series of values, one, two, . . . "k," written in base "p," the least significant digits of the representation will change at a faster rate than the most significant digits. As a result, in the Halton sequence $H_p^1$, $H_p^2, \ldots H_p^k$, the most significant digits will change at the faster rate, so that the early values in the sequence will be generally widely distributed over the interval from zero to one, and later values in the sequence will fill in interstices among the earlier values in the sequence. Unlike the random or pseudo-random numbers used in the Monte Carlo method as described above, the values of the Halton sequence are not statistically independent; on the contrary, the values of the Halton sequence are strictly deterministic, "maximally avoiding" each other over the interval, and so they will not clump, whereas the random or pseudo-random numbers used in the Monte Carlo method may clump.

It will be appreciated that the Halton sequence as described above provides a sequence of values over the interval from zero to one, inclusive along a single dimension. A multi-dimensional Halton sequence can be generated in a similar manner, but using a different base for each dimension.

A generalized Halton sequence, of which the Halton sequence described above is a special case, is generated as follows. For each starting point along the numerical interval from zero to one, inclusive, a different Halton sequence is generated. Defining the pseudo-sum $x \oplus_p y$ for any x and y over the interval from zero to one, inclusive, for any integer "p" having a value greater than two, the pseudo-sum is formed by adding the digits representing "x" and "y" in reverse order, from the most-significant digit to the least-significant digit, and for each addition also adding in the carry generated from the sum of next more significant digits. Thus, if "x" in base "p" is represented by $0.X_1 X_2 \ldots X_{M-1} X_M$, where each "$X_m$" is a digit in base "p," and if "y" in base "p" is represented by $0.Y_1 Y_2 \ldots Y_{N-1} Y_N$, where each "$Y_n$" is a digit in base "p" (and where "M," the number of digits in the representation of "x" in base "p", and "N," the number of digits in the representation of "y" in base "p", may differ), then the pseudo-sum "z" is represented by $0.Z_1 Z_2 \ldots Z_{L-1} Z_L$, where each "$Z_l$" is a digit in base "p" given by $Z_l = (X_l + Y_l + C_l) \bmod p$, where "mod" represents the modulo function, and $$C_l = \begin{cases} 1 & \text{for } X_{l-1} + Y_{l-1} + C_{l-1} \geq p \\ 0 & \text{otherwise} \end{cases}$$

and $C_1$ is set to zero.

Using the pseudo-sum function as described above, the generalized Halton sequence is generated as follows. If "p" is an integer, and $x_0$ is an arbitrary value on the interval from zero to one, inclusive, then the "p"-adic von Neumann-Kakutani transformation $T_p(x)$ is given by $$T_p(x) := x \oplus_p 1/p \tag{4},$$

and the generalized Halton sequence $x_0, x_1, x_2, \ldots$ is defined recursively as $$x_{n+1} = T_p(x_n) \tag{5}.$$

From equations (4) and (5), it is clear that, for any value for "p," the generalized Halton sequence can provide a different sequence will be generated for each starting value of "x," that is, for each $x_0$. It will be appreciated that the Halton sequence $H_p^k$ as described above is a special case of the generalized Halton sequence (equations (4) and (5)) for $x_0 = 0$.

The use of the low-discrepancy sequence in evaluating integrals to generate pixel values for pixels in an image in computer graphics will be illustrated in connection several specific computer applications, in particular, the generation of pixel values for images representing (1) soft shadows generated for scenes illuminated by a light source having a finite extent, such as a disk, as opposed to a point light source;

(2) Simulation of depth of field;

(3) motion blur;

(4) jittering; and (5) global illumination. Operations performed by the computer graphics system 10 in connection with each of these will be described below.

(1) Soft Shadows

Soft shadows can occur in a scene when objects in the scene are illuminated by a light source having a finite extent or an identifiable area, such as a disk instead of a point light source. Illusatively, when a solar eclipse occurs, the penumbra portion of the shadow cast by the moon on the earth is a soft shadow, and the umbra portion constitutes a full shadow. The umbra portion of the eclipse occurs in regions of the earth for which the moon completely obscures the sun, and the penumbra portion occurs in regions for which the moon partially obscures the sun. The degree of shadow in the penumbra lessens as one proceeds outwardly from the umbra, and the penumbra constitutes the "soft shadow" for the eclipse. For a particular shadow in a scene, the soft shadow represents a grading from the region (if any) of the scene that is in full shadow to the region for which there is no shadow.

In a scene, a portion of a pixel value for a point in a scene representing illumination by a light source having an area is generated by averaging the illumination of a particular point in a scene by a light source over the area of the light source. If the point in the scene is in a full shadow region, which may occur if the point is completely obscured by one or more objects in the scene, then the average will represent a luminance level representative of full shadow. Similarly, if the point is in a no-shadow region, then the average will represent a luminance level representative of no shadow. On the other hand, if the point is partially obscured from the full area of the light source by objects in the scene, and thus is in a soft shadow region, then the average will represent an intermediate luminance level based on the amount of the light source that is obscured. In any case, the average is given illustratively by the two-dimensional integral $$I(\vec{x}) = \int_{A'} \frac{V(\vec{x}, \vec{x}')}{|\vec{x} - \vec{x}'|^2} L_e(\vec{x}') dA', \qquad (6)$$

where $(\vec{x})$ is a point in the scene for which the illumination value is being generated, $(\vec{x}')$ is a point on the area light source, $I(\vec{x})$ represents the illumination at the point $(\vec{x})$ in the scene, $L_e(\vec{x})$ denotes the level of light emission of the area light source, and $V(\vec{x}, \vec{x}')$ is a visibility function that equals one if the point $(\vec{x}')$ on the light source is visible from the point $(\vec{x})$ in the scene and zero if the if the point $(\vec{x}')$ on the light source is not visible from the point $(\vec{x})$ in the scene. The integral is evaluated over the area A' of the light source. The formulation of the function $$\frac{V(\vec{x}, \vec{x}')}{|\vec{x} - \vec{x}'|^2} L_e(\vec{x}')$$

for a particular image is known to one of skill in the art.

At In accordance with the invention, the computer graphics system 10 evaluates the integral (equation (6)) to generate a pixel value by selecting a number "N" of sample points $(\vec{x}_i')$ using a two-dimensional generalized Halton sequence. After the sample points $(\vec{x}_i')$ are generated, the computer graphics system 10 evaluates the function $$\frac{V(\vec{x}, \vec{x}_i')}{|\vec{x} - \vec{x}_i'|^2} L_e(\vec{x}_i') \qquad (7)$$

for each of the generated sample points and approximates the value of the integral (equation (6)) as $$I(\vec{x}) \approx \overline{I(\vec{x})} = \frac{1}{N} \sum_{i=1}^{N} \frac{V(\vec{x}, \vec{x}_i')}{|\vec{x} - \vec{x}_i'|^2} L_e(\vec{x}_i') \qquad (8)$$

for each of the points $(\vec{x})$ in the scene for which the illumination value $I(\vec{x})$ is to be generated. The use of a low-discrepancy sequence, illustratively the Halton sequence, will ensure that the sample points will not clump, but instead will be evenly distributed over the area of the light source.

In one embodiment, for each of the points $(\vec{x})$ in the scene for which the illumination value $I(\vec{x})$ is to be generated, the computer graphics system 10 uses a different Halton sequence, generated in accordance with the generalized Halton sequence methodology described above (equation (5)), so as to avoid generating pixel values for which the soft shadows might otherwise appear blocky. In that embodiment, the particular Halton sequence is generated using a base value $x_0$ which is based on the coordinates of the point in the image for which the pixel value is being generated that is associated with the point $(\vec{x})$ in the scene.

Operations described above in connection with the generation of pixel values so as to provide soft shadows are depicted on the flow-chart in FIG. 2. Since the operations as depicted in that flow-chart will be readily apparent to those skilled in the art from the above description, the flow-chart in that FIG. will not be separately described in this specification.

It will be appreciated that the function $$\frac{V(\vec{x}, \vec{x}')}{|\vec{x} - \vec{x}'|^2} L_e(\vec{x}')$$

used in equation (6) is illustrative of the functions that can be used in connection with generation of pixel values to simulate soft shadows, and other functions will be apparent to those skilled in the art, with corresponding changes in equations (7) and (8). For example, although in the denominator of $$\frac{V(\vec{x}, \vec{x}')}{|\vec{x} - \vec{x}'|^2}$$

in equation (6), the term "$|\vec{x} - \vec{x}'|$" is indicated as being taken to the second power (that is, squared), it will be appreciated that other powers can be used, in which case equations (7) and (8) would be modified accordingly, In addition, although the Halton sequence has been indicated as being used to provide the sample points for the evaluation, it will be appreciated that other low-discrepancy sequences, which are known in the art, could be used instead.

In addition, it will be appreciated that, although the computer graphics system 10 has been described as simulating soft shadows in connection with area light sources, the computer graphics system 10 can also simulate soft shadows in connection with a linear light source in a manner similar to that described above. As with simulation of soft shadows for an area light source, the computer graphics system 10 will constrain the sample points $(\vec{x}_i')$ to fall on the light source. In addition, if the light source is a linear light source, the computer graphics system 10 can generate the sample points $(\vec{x}_i')$ using a one-dimensional generalized Halton sequence.

(2) Depth of Field Simulation

As noted above, the computer graphics system 10 can generate pixel values defining a rendered image representing an image which would be recorded for a pinhole camera, or alternatively it can generate pixel values defining a rendered image representing an image which would be recorded for a camera with a lens. Typically, for a camera without a lens, all of the objects are normally in focus. However, for a conventional camera with a lens, the objects at a particular distance from the lens, as well as objects within a plane of predetermined distance thereof, known as the "depth of field" would be in focus. For objects which are closer or more distant, the objects would be increasingly blurred.

To simulate generation of an image for a camera with a depth of field, the computer graphics system 10 generates a pixel value for each pixel based on the evaluation of the integral $$L(x, y) = \int_{A_{\mathit{eff}}} \vec{L}(x, y, x', y') dx' dy', \quad (9)$$

where $\vec{L}(x,y,x',y')$ denotes the luminance coming from the point (x',y') on the lens in the direction of the point (x,y) in the image plane. The computer graphics system 10 evaluates the integral over the area $A_{\mathit{eff}}$ of the lens. The formulation of the function $\vec{L}(x,y,x',y')$ for a particular image is known to one of skill in the art.

In accordance with the invention, the computer graphics system 10 evaluates the integral (equation (9)) to generate a pixel value by selecting a number "N" of sample points for points $(x_i,y_i)$ on the lens using the Halton sequence to provide the sample points. After the sample points are generated, the computer graphics system 10 evaluates the function $\vec{L}(x,y,x',y')$ for each of the "N" sample points $(x_i,y_i)$ and approximates the integral (equation (9)) as $$L(x, y) = \frac{1}{N}\sum_{i=1}^{N} \vec{L}(x, y, x_i, y_i), \quad (10)$$

In one particular embodiment, for each point $(x_i,y_i)$ on the image plane, the computer graphics system uses a different Halton sequence, generated in accordance with the generalized Halton sequence methodology described above (equation (5)), so as to avoid generating pixel values for which the rendered image might otherwise appear blocky. In that embodiment, the particular Halton sequence is generated using a base value $x_0$ which is based on the coordinates of the point in the image for which the pixel value is being generated that is associated with the point $(x_i,y_i)$ in the image plane. The use of a low-discrepancy sequence, illustratively the Halton sequence, will ensure that the sample points will not clump, but instead will be evenly distributed over the area of the lens.

Operations described above in connection with the generation of pixel values so as to provide depth of field are depicted on the flow-chart in FIG. 3. Since the operations as depicted in that flow-chart will be readily apparent to those skilled in the art from the above description, the flow-chart in that FIG. 3 will not be separately described in this specification.

The use of sample points $(x_i)$ selected as described above for the evaluation of the integral (equation (9)) is advantageous in that the use of the low-discrepancy set of sample points has a "self-avoiding" property that ensures that the sample points will not be clumped together, which clumping is possible with prior methodologies such as the random-number-based Monte Carlo method. A further advantage is that the number of sample points $(x_i)$ does not need to be selected a priori prior to the computation.

It will be appreciated that the function $\vec{L}(x,y,x',y')$ used in equation (9) is illustrative of the functions that can be used in connection with generation of pixel values to simulate depth of field, and other functions will be apparent to those skilled in the art, with corresponding changes in equation (10). In addition, although the Halton sequence has been indicated as being used to provide the sample points for the evaluation, it will be appreciated that other low-discrepancy sequences, which are known in the art, could be used instead.

(3) Motion Blur

Motion blur occurs when, for example, an object in a scene being recorded by a stationary camera is moving. The motion blur occurs because the camera's shutter has a non-zero time interval over which it is open, and, if the camera is not moved to so as to maintain the moving object at precisely the same point in the image, the point at which the moving object appears in the image moves over the time interval. Accordingly, edges of the object which are transverse to the direction of motion appears to be blurred over the image.

To simulate generation of an image of a scene in which an object is moving, by a camera whose shutter has a non-zero time interval over which it is open, the computer graphics system 10 generates a pixel value for each pixel based on the evaluation of the integral $$L(x, y) = \frac{1}{t_S}\int_{0}^{t_S} L(x, y, t) dt \quad (11)$$

where L(x,y) is the luminance of point (x,y), L(x,y,t) is the luminance of point (x,y) in the image at time "t," and "$t_s$" is the time period over which the shutter is open. It will be appreciated that L(x,y) is essentially the average of L(x,y,t) over time $t_s$. The formulation of the function L(x,y,t) for a particular image is known to one of skill in the art.

In accordance with the invention, the computer graphics system 10 evaluates the integral (equation (11)) to generate a pixel value by selecting a number "N" of sample points for points $(t_i)$ over the time interval from zero to ts using the Halton sequence to provide the sample points. After the sample points are generated, the computer graphics system 10 evaluates the function L(x,y,t) for each of the "N" sample points $(t_i)$ and approximates the integral (equation (11)) as $$L(x, y) \approx \overline{L(x, y,)} = \frac{1}{N}\sum_{i=1}^{N} L(x, y, t_i) \quad (12)$$

In one particular embodiment, for each pixel in the image, the computer graphics system 10 uses a different generalized Halton sequence, generated in accordance with the generalized Halton sequence methodology described above (equation (5)), so as to avoid generating pixel values for which the rendered image might otherwise appear blocky. In that embodiment, the particular Halton sequence is generated using a base value xo which is based on the coordinates of the point (x,y) in the image for which the pixel value is being generated. The use of a low-discrepancy sequence, illustratively the Halton sequence, will ensure that the sample points will not clump, but instead will be evenly distributed over the time period over which the integral (equation (11) is to be evaluated).

Operations described above in connection with the generation of pixel values so as to provide motion blur are depicted on the flow-chart in FIG. 4. Since the operations as depicted in that flow-chart will be readily apparent to those skilled in the art from the above description, the flow-chart in that FIG. 4 will not be separately described in this specification.

It will be appreciated that the function L(x,y,t) used in equation (11) is illustrative of the functions that can be used in connection with generation of pixel values to simulate depth of field, and other functions will be apparent to those skilled in the art, with corresponding changes in equation (12). In addition, although the Halton sequence has been indicated as being used to provide the sample points for the evaluation, it will be appreciated that other low-discrepancy sequences, which are known in the art, could be used instead.

In addition, it will be appreciated that the computer graphics system 10 may use a one-dimensional Halton sequence to generate sample points ($t_i$) for use in equation (12) along a temporal dimension "t" for each sample point (x,y) in the image. In that case, during generation of the pixel value, the computer graphics system 10 will generate the luminance value L(x,y) for the sample point (x,y) in accordance with equation (12). Alternatively, the computer graphics system 10 may use, for example, a three-dimensional Halton sequence to generate sample points ($x_i,y_i,t_i$) along both the temporal dimension "t" and spatial dimensions "x" and "y" of the image plane, for use in equation (12), and can generate the luminance value for the pixel using equation (12) using the luminance values L($x_i,y_i,t_i$), where ($x_i,y_i$) are sample points within the region of the pixel.

(4) Jittering

To generate a pixel value for a pixel which represents the color of the pixel at the respective point in the image, the color represented by the pixel value is averaged over the area of the pixel. To simulate that, the computer graphics system 10 generates the pixel value for pixel $P_i$ to have an averaged color $L_i$ by evaluating the integral $$L_i = \frac{1}{|P_i|} \int_{P_i} L(x, y) dx dy, \quad (13)$$

where L(x,y) represents the color at point (x,y) in the image, and $|P_i|$ represents the area of the pixel $P_i$. The formulation of the function L(x,y) for a particular image is known to one of skill in the art.

The computer graphics system 10 can evaluate the integral (equation (13)) to generate a pixel value by selecting a number "N" of sample points ($x_i,y_i$) in the pixel $P_i$ using the Halton sequence to provide the sample points. After the sample points are generated, the computer graphics system 10 evaluates the function L(x,y) for each of the "N" sample points ($x_i,y_i$) and approximates the integral (equation (13)) as $$L(x, y) \approx \overline{L(x, y_i)} = \frac{1}{N} \sum_{i=1}^{N} L(x_i, y_i) \quad (14)$$

Several problems arise, however, if the integral (equation (13)) is evaluated using a Halton sequence generated for each pixel. First, although the Halton sequence guarantees that no clumping occurs within a single pixel, it will not guarantee that clumping will not occur at boundaries of adjacent pixels. In addition, the Halton sequences generated for the pixels would exhibit periodicity on the pixel level, in which case artifacts may be generated in the image which can be evident to the eye.

Thus, to accommodate these problems, in accordance with the invention, the computer graphics system 10 generates the Halton sequence to generate the sample points either for the image as a whole or for a predetermined number of contiguous pixels in the following manner. Initially, the computer graphics system 10 divides the image or the predetermined number of contiguous pixels based on a grid of size "n" by "m," where $n=2^i$ is a positive power ("i") of two and $m=3^j$ is a positive power ("j") of three. (In this description, two and three are the number bases (that is, "p" in equations 4 and 5 describing the one-dimensional Halton sequence) selected for generation of the two-dimensional Halton sequence; if the computer graphics system 10 uses other number bases for generation of the two-dimensional Halton sequence, then "n" and "m" would be selected to be powers of those number bases.) Then the computer graphics system 10 generates the set of sample points ($x_i,y_i$) to be used in evaluating equation (14) as ($nH_2^k$, $mH_3^k$) for k=1, . . . , nm, which constitutes a scaled two-dimensional Halton sequence, with the scaling being in accordance with the values of "n" and "m". The sample points so generated, precisely one sample point will be provided in each of a plurality of sub-pixels in each pixel, if the left and lower boundaries of each sub-pixel are deemed to form part of the sub-pixel and the right and upper boundaries of each sub-pixel are deemed not to form part of the sub-pixel.

For example, if the computer graphics system 10 is to generate sample points on "N" by "N" sub-pixels for each pixel, and if the number of columns in the image or the selected sub-set of contiguous pixels is $Res_x$, and if the number of rows of pixels in the image or the selected sub-set of contiguous pixels is $Res_y$, then the computer graphics system 10 can generate a number of $N \cdot Res_x \times N \cdot Res_y$, of sample points to be used with the pixels in the image or selected subset of pixels by initially selecting integers "i" and"j" such that $n=2^i \geq N \cdot Res_x$ and $m=3^j \geq N \cdot Res_y$. Note that the sub-pixel grid of "n" by "m" sub-pixels will in general be larger than the size of the image or selected subset of contiguous pixels.

According to the mechanism described above, the computer graphics system 10 can evaluate the integral in equation (14) for each pixel using the sample points which are provided within the area of the respective pixel.

Several benefits arise from generating sample points using the scaled two-dimensional Halton sequence ($nH_2^k$, $mH_3^k$) for the entire image or selected sub-set of contiguous pixels in evaluating the integral in equation (14), instead of using the unscaled Halton sequence (that is, illustratively, ($H_2^k$, $H_3^k$)) within one pixel as the sample points. First, by using a scaled two-dimensional Halton sequence, periodicity of the sample points on the level of a pixel, which can occur in connection with the unscaled twodimensional Halton sequence, will be avoided. In addition, the use of a scaled two-dimensional Halton sequence ($nH_2^k$, $mH_3^k$) will ensure that no clumping of sample points will occur at the boundaries of adjacent pixels, which can occur in connection with the unscaled two-dimensional Halton sequence. Therefore, the use of a scaled two-dimensional Halton sequence ($nH_2^k$, $mH_3^k$) will ensure that the sample points will be evenly distributed throughout the entire image or contiguous region of pixels. This will also be the case if relatively few sample points are used, and even if only one sample point per pixel is used.

Operations described above in connection with the generation of pixel values so as to provide jittering are depicted on the flow-chart in FIG. 5. Since the operations as depicted in that flow-chart will be readily apparent to those skilled in the art from the above description, the flow-chart in that FIG. 5 will not be separately described in this specification.

It will be appreciated that the function L(x,y) used in equation (13) is illustrative of the functions that can be used in connection with generation of pixel values to simulate jittering, and other functions will be apparent to those skilled in the art, with corresponding changes in equation (14). In addition, although the Halton sequence has been indicated as being used to provide the sample points for the evaluation, it will be appreciated that other low-discrepancy sequences, which are known in the art, could be used instead.

(5) Global Illumination

"Global illumination" includes a class of optical effects, such as indirect illumination, diffuse and glossy inter-reflections, caustics and color bleeding, which the computer graphics system 10 simulates in generating an image of objects in a scene. For the simulation of global illumination, a "rendering equation" is solved. For the general form of an illustrative rendering equation useful in global illumination simulation, namely:

$$L(\vec{x},\vec{w}) = L_e(\vec{x},\vec{w}) + \int_{S'} f(\vec{x},\vec{w}' \to \vec{w}) G(\vec{x},\vec{x}') V(\vec{x},\vec{x}') L(\vec{x}',\vec{w}') dA' \quad (15)$$

it is recognized that the light radiated at a particular point x in a scene is generally the sum of two components, namely, the amount of light (if any) that is emitted from the point and the amount of light (if any) which originates from all other points and which is reflected or otherwise scattered from the point $\vec{x}$. In equation (15), $L(\vec{x},\vec{w})$ represents the radiance at the point $\vec{x}$ in the direction $\vec{w}=(\theta,\phi)$ (where "$\theta$" represents the angle of direction $\vec{w}$ relative to a direction orthogonal of the surface of the object in the scene containing the point $\vec{x}$, and "$\phi$" represents the angle of the component of direction $\vec{w}$ in a plane tangential to the point $\vec{x}$). Similarly, $L(\vec{x}',\vec{w}')$ in the integral represents the radiance at the point $\vec{x}'$ in the direction $\vec{w}'=(\theta',\phi')$ (where "$\theta'$" represents the angle of direction $\vec{w}'$ relative to a direction orthogonal of the surface of the object in the scene containing the point $\vec{x}'$, and "$\phi'$" represents the angle of the component of direction $\vec{w}'$ in a plane tangential to the point $\vec{x}'$), and represents the light, if any, that is emitted from point $\vec{x}'$ which may be reflected or otherwise scattered from point $\vec{x}$.

In equation (15), $L_e(\vec{x},\vec{w})$ represents the first component of the sum, namely, the radiance due to emission from the point $\vec{x}$ in the direction $\vec{w}$, and the integral over the sphere S' represents the second component, namely, the radiance due to scattering of light at point $\vec{x}$. $f(\vec{x},\vec{w}' \to \vec{w})$ is a bidirectional scattering distribution function which describes how much of the light coming from direction $\vec{w}'$ is reflected, refracted or otherwise scattered in the direction $\vec{w}$, and is generally the sum of a diffuse component, a glossy component and a specular component. In equation (15), the function $G(\vec{x},\vec{x}')$ is a geometric term $$G(\vec{x},\vec{x}') = \frac{\cos\theta \cos\theta'}{|\vec{x}-\vec{x}'|^2}, \quad (16)$$

where $\theta$ and $\theta'$ are angles relative to the normals of the respective surfaces at points $\vec{x}$ and $\vec{x}'$, respectively. Further in equation (15), $V(\vec{x},\vec{x}')$ is a visibility function which equals the value one if the point $\vec{x}'$ is visible from the point $\vec{x}$ and zero if the point $\vec{x}'$ is not visible from the point $\vec{x}$. The formulation of the various functions $L(\vec{x},\vec{w})$, $L(\vec{x}',\vec{w}')$, $L_e(\vec{x},\vec{w})$, $f(\vec{x},\vec{w}' \to \vec{w})$, $G(\vec{x},\vec{x}')$ and $V(\vec{x},\vec{x}')$ for a particular image is known to one of skill in the art.

The computer graphics system 10 uses global illumination and the rendering equation, namely, equation (15), in connection with generation of an image to simulate a number of optical effects as noted above. In particular, in connection with one aspect of simulation using ray tracing, in which the computer graphics system 10 simulates an image as viewed by an observer by tracing rays, representing photons, from a light source to the eye of the observer, in accordance with the invention the computer graphics system 10 uses a "strictly deterministic Russian roulette" methodology to determine whether or not to terminate a simulated ray, using a strictly-deterministic method in that determination.

By way of background, an equation such as the equation (15) of the form $$f(x) = g(x) + \int_0^1 K(x,y) f(y) dy \quad (17)$$

where f(x) (and similarly f(y)) is an unknown function, g(x) is a known function (in the context of the rendering equation (equation (15)) $g(x)=L_e(\vec{x},\vec{w})$) and K(x,y) is another known function which serves as a "kernel" of the integral operator (in the context of the rendering equation (equation 15), $K(x,w)=f(\vec{x},\vec{w}' \to \vec{w}) G(\vec{x},\vec{x}') V(\vec{x},\vec{x}')$), can be formally solved by repeatedly substituting the function "f" in the integral, as follows:

$$f(x) = g(x) + \int_0^1 K(x,x_1) g(x_1) dx_1 + \quad (18)$$
$$\int_0^1 \int_0^1 K(x,x_1) K(x_1,x_2) g(x_2) dx_1 dx_2 +$$
$$\int_0^1 \int_0^1 \int_0^1 K(x,x_1) K(x_1,x_2) K(x_2,x_3) g(x_3) dx_1 dx_2 dx_3 + \ldots .$$

which constitutes an infinite Neumann series. Equation (17), in turn, can be approximately numerically evaluated by performing a low-discrepancy sampling of the first "L" terms of the Neumann series in equation (18), where "g(x)" is considered as a zeroth term, using an "L"-dimensional low-discrepancy sequence $(\xi_1^{(n)}, \ldots, \xi_L^{(n)})$, where "n" denotes a sequence index. In one embodiment, an "L"-dimensional low-discrepancy sequence is illustratively an L-dimensional Halton sequence, for which, as described above, the elements of the sequence tend to maximally avoid one another. For each element of the sequence, an estimator value $f^{(n)}(x)$ is generated as $$f^{(n)}(x) = g(x) + K(x,\xi_1^{(n)}) g(\xi_1^{(n)}) + K(\xi_1^{(n)},\xi_2^{(n)}) g(\xi_2^{(n)}) + \ldots + K(\xi_{L-1}^{(n)},\xi_L^{(n)}) g(\xi_L^{(n)}) \quad (19)$$

and the approximation for f(x) is obtained using "N" estimators $f^{(n)}(x)$ generated in accordance with equation (19) as $$f(x) \approx \overline{f(x)} = \frac{1}{N} \sum_{n=1}^{N} f^{(n)}(x). \tag{20}$$

The use of a low-discrepancy sequence, illustratively the Halton sequence, will ensure that the sample points will not clump, but instead will be evenly distributed over the L-dimensional space over which the first "L" terms of the Neumann series (equation (18)) are to be evaluated.

One problem with using the methodology described above in connection with equations (17) through (20) to evaluate the rendering equation (equation (15)) is that, although the Neumann series (equation (18)) is an infinite series, to evaluate the series at some point the series will need to be truncated. In connection with evaluation of the rendering equation (equation (15)), truncation of the Neumann series may result in loss of desirable features in the image. To alleviate this problem, in accordance with the invention, the computer graphics system 10 uses a methodology which also generates an approximation for f(x) using "N" estimators, but which ensures that, for each estimator, the number of terms in the series used to generate the estimator is not infinite. Thus, in the methodology in accordance with the invention, no truncation is necessary for generation of the estimators, thereby ensuring that features of the image will not be lost.

The methodology in accordance with the invention, which is termed herein the "strictly deterministic Russian roulette" methodology, will be described below. Preliminarily, recognizing that ft the numerical value "one" can be represented as an integral as $$1 = \frac{1}{w} \int_0^1 \Theta(w - x) dx \tag{21}$$

where $\Theta(x)$ denotes the Heaviside function (otherwise known as the "step function") which is defined as $$\Theta(x) = \begin{cases} 1 & \text{for } x \geq 0 \\ 0 & \text{for } x < 0, \end{cases} \tag{22}$$

and where "w" is a weight factor from the interval zero (exclusive) to one (inclusive). Using equations (21) and (22), a strictly deterministic estimator $1_{est}$ for the numerical value "one" as $$1_{est}^{(n)} = \frac{1}{w} \Theta(w - \xi^{(n)}) = \begin{cases} \frac{1}{w} & \text{for } w \geq \xi^{(n)} \\ 0 & \text{for } w < \xi^{(n)} \end{cases} \tag{23}$$

and generating an estimate for the numerical value "one" as $$1 \approx \overline{1} = \frac{1}{N} \sum_{n=1}^{N} 1_{est}^{(n)} = \frac{1}{N} \sum_{n=1}^{N} \frac{1}{w} \Theta(w - \xi^{(n)}). \tag{24}$$

Using equation (21), assuming that K(x,y) takes values in the interval from zero to one, it (that is, K(x,y)) can be written as $$K(x, y) = \int_0^1 \Theta(K(x, y) - x') dx'. \tag{25}$$

Using equation (25), the Neumann series (equation (18)) is re-formulated as $$f(x) = g(x) + \int_0^1 \int_0^1 \Theta(K(x, x_1) - x_1') g(x_1) dx_1 dx_1' + \tag{26}$$
$$\int_0^1 \int_0^1 \int_0^1 \int_0^1 \Theta(K(x, x_1) - x_1')$$
$$\Theta(K(x_1, x_2) - x_2') g(x_2) dx_1 dx_1' dx_2 dx_2' + \ldots .$$

Comparing equation (26) with equation (18), it will be appreciated that, for every n-dimensional integral in equation (18), a 2n-dimensional integral has been provided in equation (26), and that, for every integration over $x_l$ (index $l=1,2,\ldots$), an additional integration over $x_l'$ is provided in equation 26.

As with equation (17) above, equation (26) is evaluated to provide a numerical approximation by performing a low-discrepancy sampling of the first "L" terms of the Neumann series in equation (26), where "g(x)" is considered as a zeroth term, using a multi-dimensional low-discrepancy sequence $(\xi_1^{(n)}, \xi'_1^{(n)}, \xi_2^{(n)}, \xi'_2^{(n)}, \ldots, \xi_L^{(n)}, \xi'_L^{(n)})$, where "n" denotes a sequence index and "2L" is the largest number of components that are required in the course of the simulation of length "N." It will be apparent from the following that the value of "L" does not have to be known or selected by the computer graphics system 10 a priori, and that the successive components $\xi_1^{(n)}$ and $\xi'_1^{(n)}$ of the low-discrepancy sequence can be generated on demand. In one embodiment, each "2L-dimensional" low-discrepancy sequence is illustratively an 2L-dimensional Halton sequence, for which, as described above, the elements of the sequence tend to maximally avoid one another. For each element of the sequence, an estimator value $f_{RR}^{(n)}(x)$ is generated as $$f_{RR}^{(n)}(x) = g(x) + \Theta(K(x,\xi_1^{(n)}) - \xi'_1^{(n)}) g(\xi_1^{(n)}) + \Theta(K(x,\xi_1^{(n)}) - \xi'_1^{(n)}) \Theta(K(\xi_1^{(n)},\xi_2^{(n)}) - \xi'_2^{(n)}) g(\xi_2^{(n)}) + \Theta(K(x,\xi_1^{(n)}) - \xi'_1^{(n)}) \Theta(K(\xi_1^{(n)},\xi_2^{(n)}) - \xi'_2^{(n)}) \Theta(K(\xi_2^{(n)},\xi_3^{(n)}) - \xi'_3^{(n)}) g(\xi_3^{(n)}) + \tag{27}$$

It will be appreciated that, in equation (27), in the context of the rendering equation (equation (15)), the term "g(x)" in the sum corresponds to the emitted radiance term $L_e(\vec{x}, \vec{w})$ of the rendering equation, and the other terms provide an estimate for the integral $$\int_{S'} f(\vec{x}, \vec{w}' \to \vec{w}) G(\vec{x}, \vec{x}') V(\vec{x}, \vec{x}') L(\vec{x}', \vec{w}') dA'$$

in the rendering equation for the particular element of the multi-dimensional Halton sequence used in the generation of the estimator.

It will be appreciated that from the definition of the Heaviside function (equation (22) that, if, at a particular level "l," the value of $\xi'_l^{(n)}$ is larger than $K(\xi_{l-1}^{(n)}, \xi_l^{(n)})$, the corresponding Heaviside function will be zero at that term, and for successively higher terms in equation (27). Accordingly, by formulating the estimator $f_{RR}^{(n)}(x)$ as in equation 27, the infinite Neumann series is self-truncating and therefore reduced to a finite series. Thus, the approximation for f(x) can be obtained as $$f(x) \approx \overline{f(x)} = \frac{1}{N} \sum_{n=1}^{N} f_{RR}^{(n)}(x), \qquad (28)$$

which, in the context of the rendering equation (equation (15)) provides the value for $L(\vec{x}, \vec{w})$, that is, the radiance at the point $\vec{x}$ in the image in the direction $\vec{w} = (\theta, \phi)$.

As described above, the methodology described above in connection with equations (21) through (28) assumes that K(x,y) takes values in the numerical interval from zero to one. If K(x,y) does not take values on that interval, then the methodology can be generalized by taking a function p(x,y) that does take values in the interval from zero to one, and writing K(x,y) as $$\frac{K(x, y)}{p(x, y)} p(x, y)$$

and replace the expression (reference equation (25)) by $$\frac{K(x, y)}{p(x, y)} \int_0^1 \Theta(p(x, y) - y') \, dy'.$$

In that case, the estimator value $f_{RR}^{(n)}(x)$ (equation (27)) would be generated as:

$$f_{RR}^{(n)}(x) = g(x) + \frac{K(x, \xi_1^{(n)})}{p(x, \xi_1^{(n)})} \Theta(p(x, \xi_1^{(n)}) - \xi_1^{\prime(n)}) g(\xi_1^{(n)}) + \qquad (27a)$$

$$\frac{K(x, \xi_1^{(n)})}{p(x, \xi_1^{(n)})} \Theta(p(x, \xi_1^{(n)}) - \xi_1^{\prime(n)})$$

$$\frac{K(\xi_1^{(n)}, \xi_2^{(n)})}{p(\xi_1^{(n)}, \xi_2^{(n)})} \Theta(p(\xi_1^{(n)}, \xi_2^{(n)}) - \xi_2^{\prime(n)}) g(\xi_2^{(n)}) + \ldots \, .$$

With this background, in accordance with the strictly deterministic Russian roulette methodology, after the integral kernel $K(x,x')=f(\vec{x}, \vec{w}' \to \vec{w}) G(\vec{x}, \vec{x}') V(\vec{x}, \vec{x}')$ and the emitted radiance term $L_e(\vec{x}, \vec{w})$ have been developed for the rendering equation (equation (15)) for a point $\vec{x}$ in the scene for which an image is being simulated by the computer graphics system 10, the computer graphics system 10 generates a numerical approximation of the solution of the rendering equation. In that operation, a value for "N," the number of estimators $f^{(n)}_{RR}(x)$ to be used in generating the approximation for $L(\vec{x}, \vec{w})$ in the rendering equation (equation (28)) is selected, and the computer graphics system 10 generates "N" elements of a multi-dimensional Halton sequence. For each such element, the computer graphics system 10 will generate the estimator $f^{(n)}_{RR}(x)$ in accordance with equation (27). In that operation, the computer graphics system 10 generates values for each successive term of the sum in equation (27), and adds the generated value to the previously-generated value(s), until it determines that the term has the value zero. When the computer graphics system 10 determines that a term of the sum in equation (27) is zero, it can terminate operations for that particular estmator $f^{(n)}_{RR}(x)$. After the computer graphics system 10 has generated estimators $f^{(n)}_{RR}(x)$ for all of the "N" elements of the multidimensional Halton sequence that were generated as described above, the computer graphics system 10 will generate a numerical approximation for the rendering equation as the average of the estimators, as indicated in connection with equation (28).

Figure 6B:
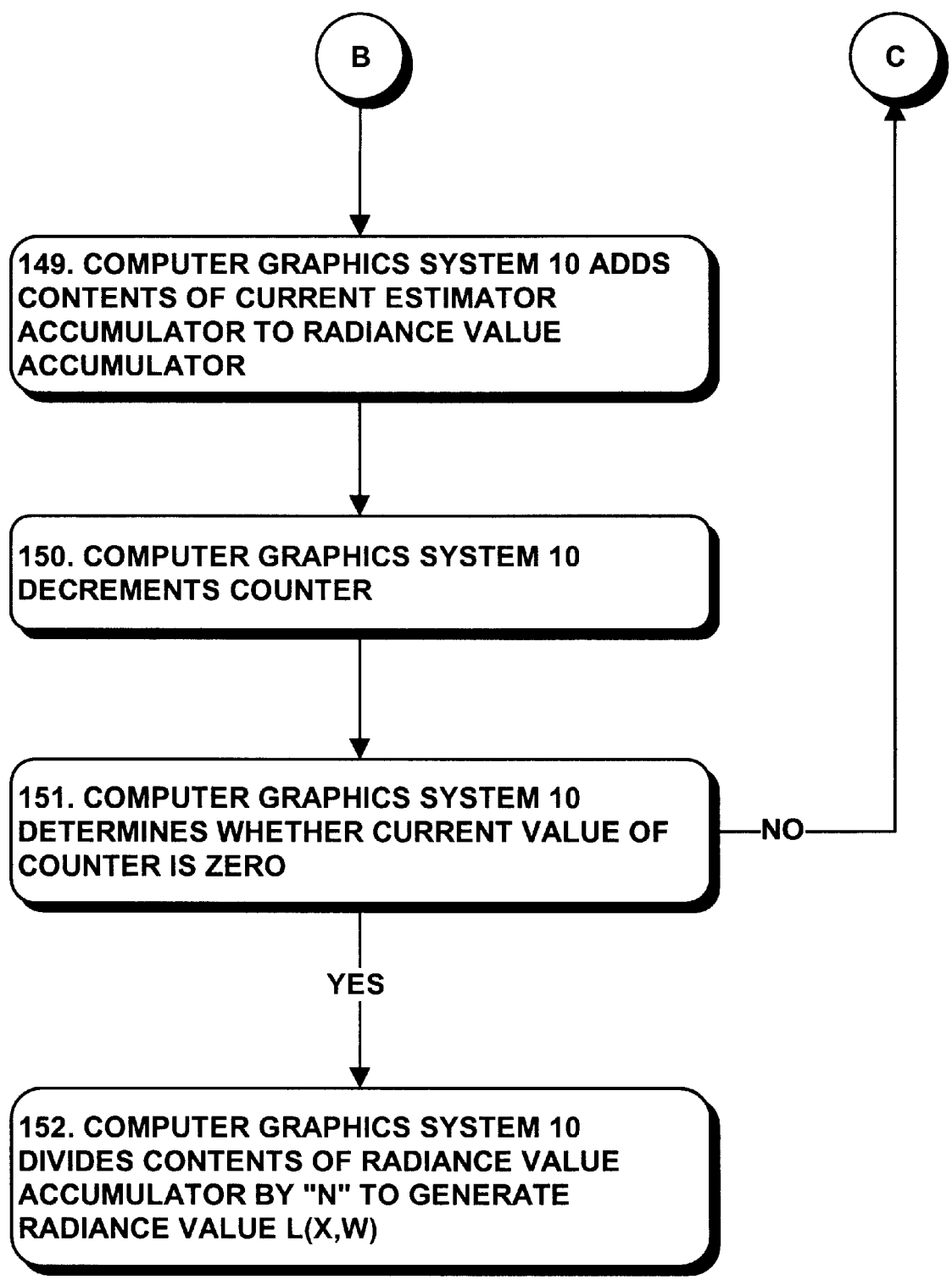

Operations described above in connection with the generation of pixel values so as to simulate global illumination are depicted on the flow-chart in FIG. 6. Since the operations as depicted in that flow-chart will be readily apparent to those skilled in the art from the above description, the flow-chart in that FIG. 6 will not be separately described in this specification.

It will be appreciated by those skilled in the art that the form of the rendering equation as set forth above in equation (15), and the various functions therein, are illustrative of the form and functions that can be used in connection with generation of pixel values to simulate global illumination, and other integral forms and functions will be apparent to those skilled in the art, with corresponding changes particularly in equation (27). For example, the specific form of the integral and various functions therein may differ from that described above if the computer graphics system 10 is to simulate global illumination for, for example, different numbers of dimensions than those contemplated in the formulation above, or if the simulation is to be performed with multiple colors, or if surfaces in the scene are diffuse, glossy or specular (using a so-called "local illumination model"), or if a decision is to be made as to whether to reflect or refract a ray at a particular surface. Although the formulation of the rendering equation and various functions therein may differ in some specific aspects from that described herein, generally, however, the specific rendering equation used therefor will have a form corresponding to that set forth in equation (17) above, and so the computer graphics system 10 can use the strictly deterministic Russian roulette methodology as described above in connection with equations (27) and (28) to evaluate the equation.

As described above in connection with equation (27), generation of an estimator $f^{(n)}_{RR}(x)$ for each "x" makes use of a multi-dimensional low-discrepancy sequence $(\xi_1^{(n)}, \xi'_1^{(n)}, \xi_2^{(n)}, \xi'_2^{(n)}, \ldots, \xi_L^{(n)}, \xi'_L^{(n)})$. The "unprimed" components $\xi_1^{(n)}, \ldots, \xi_L^{(n)}$ of the sequence are related (reference equation (26)) to the integration over the unprimed variables $x_1, x_2, \ldots$, and the "primed" components $\xi'_1^{(n)}, \ldots, \xi'_L^{(n)}$ of the sequence are related (reference equation (26)) to the integration over the primed variables $x'_1, x'_2, \ldots$. It will be appreciated by those skilled in the art that, in some circumstances, it may be desirable to use, instead of the "raw" unprimed components $\xi_1^{(n)}, \ldots, \xi_L^{(n)}$ in generating the estimators $f^{(n)}_{RR}(x)$, a selected function or transformation of the components of the sequence in generating the estimators $f^{(n)}_{RR}(x)$, which function can be selected to ensure that features in the function K(x,y) will be efficiently captured in the evaluation. It is generally desirable, however, to ensure that the "raw" primed components $\xi'_1^{(n)}, \ldots, \xi'_L^{(n)}$ are used in generating the estimators $f^{(n)}_{RR}(x)$ even if a function or transformation of the unprimed components $\xi_1^{(n)}, \ldots, \xi_L^{(n)}$ is used.

In addition, although the Halton sequence has been indicated as being used to provide the sample points for the evaluation, it will be appreciated that other low-discrepancy sequences, which are known in the art, could be used instead.

The strictly deterministic Russian roulette methodology, using a strictly-deterministic low-discrepancy sequence such as a multi-dimensional Halton sequence, as described above in connection with equations (21) through (28), provides a number of advantages over both a Monte Carlo Russian roulette methodology (that is, a Russian roulette methodology using random numbers), as well as a non-Russian roulette methodology as described above in connection with equations (18) through (20). With respect to a Monte Carlo Russian roulette methodology, as with any other Monte Carlo methodology, such a methodology would use random numbers, and thus would have similar deficiencies as described above. That is, unlike the strictly-deterministic Russian roulette methodology, whose strictly-detenniristic low-discrepancy sequence ensures a priori that the sample points will be generally evenly distributed over the multi-dimensional regions over which the estimators are to be evaluated in a low-discrepancy manner, in comparison to the clumping that can result from random numbers used with a Monte Carlo Russian roulette methodology. Thus, the strictly-deterministic low-discrepancy Russian roulette methodology can require fewer estimators to provide a satisfactory value for the approximation $\overline{f(x)}$ than would a Monte Carlo Russian roulette methodology.

In addition, unlike the strictly deterministic Russian Roulette methodology, for the non-Russian roulette methodology (equations (18) through (20)), it is generally the case that the Neumann series used to generate each estimator $f^{(n)}(x)$ (equation (19)) is an infinite series. Accordingly, each such series needs to be truncated at predetermined maximum number of terms, which can result in loss of features in the image. As described above in connection with equations (27) and (28), in the strictly deterministic Russian roulette methodology, for each estimator $f^{(n)}{}_{RR}(x)$, at a particular level "1," the value of the term of the estimator (equation (27)) for that level and any subsequent levels will be guaranteed to be zero, so that the series is a finite series. Otherwise stated, for the strictly-deterministic Russian roulette methodology, the series (equation (27)) is guaranteed to be self-truncating, whereas for the strictly-deterministic non-Russian roulette methodology, the series (equation (19)) is not generally self-truncating and instead will generally require the computer graphics system 10 to truncate the series. Thus, unlike the strictly-deterministic non-Russian roulette methodology, the strictly-deterministic Russian roulette methodology will ensure that no features of the image will be lost.

In addition, generally with an infinite series such as the Neumann series used in connection with the estimators $f^{(n)}(x)$, the first several terms of the series provide the primary contribution to the rnz resulting value of the estimators $f^{(n)}(x)$. Because of the self-truncating property, the strictly-deterministic Russian roulette methodology improves on the non-Russian roulette methodology (as described above in connection with equations (18) through (20)) at least for the reason that the first several terms of the Neumann series (which are the most important terms) are taken account in the estimator $f^{(n)}(x)$ much more often than the following terms of the Neumann series (which are generally less important). Thus, the strictly-deterministic Russian roulette methodology can require fewer estimators to provide a satisfactory value for the approximation $\overline{f(x)}$ compared to a non-Russian roulette methodology.

Furthermore, since, with the strictly-deterministic Russian roulette methodology, the series for each estimator $f^{(n)}{}_{RR}(x)$ is self-truncating, the methodology allows for an automatic determination of whether or not to terminate a ray path in the global illumination simulation. In both equation (18) and equation (26), each pair $(x, x_1), (x_1, x_2), \ldots, (x_i, x_j)$ represents a respective ray path extending from point "$x_j$" to point "$x_i$" in space (to be read from right to left), and, in each estimator, each term represents a contribution of the ray to the global illumination simulation. Since, in the strictly-deterministic Russian roulette methodology, the series used to generate each estimator $f^{(n)}{}_{RR}(x)$ automatically self-truncates, for the pair $(x_i, x_j)$ for which the term is zero, the ray path $(x, x_1), (x_1, x_2), \ldots, (x_i, x_j)$ automatically terminates. On the other hand, since, as described above, the strictly-deterministic non-Russian roulette methodology does not automatically terminate, the ray path does not automatically terminate, but instead will be terminated at the point associated with the term for which the series is arbitrarily truncated.

As noted above, the pairs $(x, x_1), (x_1, x_2), \ldots, (x_i, x_j)$ represent a respective ray path extending from point "$x_j$" to point "$x_i$" in space. In the strictly-deterministic Russian roulette methodology described above in connection with equations (21) through (28), the ray path is assumed to extend from a light source. An analogous methodology useful in connection with ray paths extending from, for example a camera, will be apparent to those skilled in the art.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A computer graphics system for generating a pixel value for a pixel in an image, the pixel being representative of a point $\vec{x}$ in a scene, the computer graphics system generating the pixel value to simulate global illumination that is represented by an evaluation of a function f(x) over a sphere centered at the point in the scene, the function f(x) having the form $f(x)=g(x)+\int K(x,y)f(y)dy$, where f(x) (and similarly f(y)) is an unknown function, and g(x) and K(x,y) are known functions, with K(x,y) serving as a "kernel" of the integral, the computer graphics system comprising:

A. an estimator generator for generating a selected number "N" of estimators $f^{(n)}{}_{RR}(x)$ as $$f_{RR}{}^{(n)}=g(x)+\Theta(K(x,\xi_1{}^{(n)})-\xi'_1{}^{(n)})g(\xi_1{}^{(n)})+\Theta(K(x,\xi_1{}^{(n)})-\xi'_1{}^{(n)})\Theta(K(\xi_1{}^{(n)},\xi_2{}^{(n)})-\xi'_2{}^{(n)})g(\xi_2{}^{(n)})+\Theta(K(x,\xi_1{}^{(n)})-\xi'_1{}^{(n)})\Theta(K(\xi_1{}^{(n)},\xi_2{}^{(n)})-\xi'_2{}^{(n)})\Theta(K(\xi_2{}^{(n)},\xi_3{}^{(n)})-\xi'_3{}^{(n)})g(\xi_3{}^{(n)})+\ldots$$

where $\Theta(x)$ represents the Heaviside function, and $\xi_1{}^{(n)}, \xi'_1{}^{(n)}, \xi_2{}^{(n)}, \xi'_2{}^{(n)}, \ldots, \xi_L{}^{(n)}, \xi'_L{}^{(n)}$, represent components of a predetermined multi-dimensional strictly deterministic low-discrepancy sequence and where "n" denotes a sequence index, the estimator generator generating successive terms for each estimator $f^{(n)}{}_{RR}(x)$ until it generates a term having the value zero;

B. a luminance value generator for generating a luminance value for the point in the scene as the average of said estimator values generated by said estimator generator; and C. a pixel value generator for using the luminance value generated for the point in the scene in generating the pixel value.

2. A computer graphics system as defined in claim 1 in which said predetermined low-discrepancy sequence is a multi-dimensional generalized Halton sequence.

3. A computer graphics system as defined in claim 1 in which said estimator generator generates said estimators $f^{(n)}{}_{RR}(x)$ as $$f_{RR}^{(n)}(x) = g(x) + \frac{K(x, \xi_1^{(n)})}{p(x, \xi_1^{(n)})} \Theta(p(x, \xi_1^{(n)}) - \xi_1'^{(n)}) g(\xi_1^{(n)}) +$$

$$\frac{K(x, \xi_1^{(n)})}{p(x, \xi_1^{(n)})} \Theta(p(x, \xi_1^{(n)}) - \xi_1'^{(n)})$$

$$\frac{K(\xi_1^{(n)}, \xi_2^{(n)})}{p(\xi_1^{(n)}, \xi_2^{(n)})} \Theta(p(\xi_1^{(n)}, \xi_2^{(n)}) - \xi_2'^{(n)}) g(\xi_2^{(n)}) + \ldots$$

where "p(x,y)" represents an arbitrary function which takes values in the interval from zero to one.

4. A computer graphics system as defined in claim 1 in which the estimator generator uses in generating at least one estimator value as unprimed components $\xi_1^{(n)}, \ldots, \xi_L^{(n)}$, unprimed components of said low-discrepancy sequence $(\xi_1^{(n)}, \xi_1'^{(n)}, \xi_2^{(n)}, \xi_2'^{(n)}, \ldots, \xi_L^{(n)}, \xi_L'^{(n)})$ which have been processed in accordance with a selected transformation.

5. A computer graphics system as defined in claim 1 in which:

A. $g(x) = L_e(\vec{x}, \vec{w})$, the radiance due to emission from the point $\vec{x}$ in the direction $\vec{w}$; and B. $K(x,y) = f(\vec{x}, \vec{w}' \to \vec{w}) G(\vec{x}, \vec{x}') V(\vec{x}, \vec{x}')$, where (i) function $f(\vec{x}, \vec{w}' \to \vec{w})$ is a bidirectional scattering distribution function which describes how much light coming from direction $\vec{w}'$ is reflected, refracted or otherwise scattered in a direction $\vec{w}$, and is generally the sum of a diffuse component, a glossy component and a specular component;

(ii) function $G(\vec{x}, \vec{x}')$ is a geometric term:

$$G(\vec{x}, \vec{x}') = \frac{\cos\theta \cos\theta'}{|\vec{x} - \vec{x}'|^2}, \quad (32)$$

where θ and θ' are angles relative to the normals of the respective surfaces at points $\vec{x}$ and $\vec{x}'$, respectively, and (iii) function $V(\vec{x}, \vec{x}')$ is a visibility function which equals the value one if the point $\vec{x}'$ is visible from the point $\vec{x}$ and zero if the point $\vec{x}'$ is not visible from the point $\vec{x}$.

6. A computer graphics method for generating a pixel value for a pixel in an image, the pixel being representative of a point $\vec{x}$ in a scene, the pixel value being generated so as to simulate global illuminlation that is represented by an evaluation of an integral over a sphere centered at the point in the scene, the integral having the form $f(x) = g(x) + \int K(x,y) f(y) dy$, where f(x) (and similarly f(y)) is an unknown function, and g(x) and K(x,y) are known functions, with K(x,y) serving as a "kernel" of the integral, the computer graphics system comprising:

A. generating a selected number "N" of estimators $f^{(n)}_{RR}(x)$ as $$f_{RR}^{(n)} = g(x) + \Theta(K(x,\xi_1^{(n)}) - \xi_1'^{(n)}) g(\xi_1^{(n)}) + \Theta(K(x,\xi_1^{(n)}) - \xi_1'^{(n)}) \Theta(K(\xi_1^{(n)},\xi_2^{(n)}) - \xi_2'^{(n)}) g(\xi_2^{(n)}) + \Theta(K(x,\xi_1^{(n)}) - \xi_1'^{(n)}) \Theta(K(\xi_1^{(n)},\xi_2^{(n)}) - \xi_2'^{(n)}) \Theta(K(\xi_2^{(n)},\xi_3^{(n)}) - \xi_3'^{(n)}) g(\xi_3^{(n)}) + \ldots$$

where $\Theta(x)$ represents the Heaviside function, and $\xi_1^{(n)}, \xi_1'^{(n)}, \xi_2^{(n)}, \xi_2'^{(n)}, \ldots, \xi_L^{(n)}, \xi_L'^{(n)}$, represent components of a predetermined multi-dimensional strictly deterministic low-discrepancy sequence and where "n" denotes a sequence index, the estimator generator generating successive terms for each estimator $f^{(n)}_{RR}(x)$ until it generates a term having the value zero;

B. generating a luminance value for the point in the scene as the average of said estimator values; and C. using the luminance value generated for the point in the scene in generating the pixel value.

7. A computer graphics method as defined in claim 6 in which said predetermined low-discrepancy sequence is a generalized multi-dimensional Halton sequence.

8. A computer graphics method as defined in claim 7 in which said estimators $f^{(n)}_{RR}(x)$ are generated in said estimator generation step as $$f_{RR}^{(n)}(x) = g(x) + \frac{K(x, \xi_1^{(n)})}{p(x, \xi_1^{(n)})} \Theta(p(x, \xi_1^{(n)}) - \xi_1'^{(n)}) g(\xi_1^{(n)}) +$$

$$\frac{K(x, \xi_1^{(n)})}{p(x, \xi_1^{(n)})} \Theta(p(x, \xi_1^{(n)}) - \xi_1'^{(n)})$$

$$\frac{K(\xi_1^{(n)}, \xi_2^{(n)})}{p(\xi_1^{(n)}, \xi_2^{(n)})} \Theta(p(\xi_1^{(n)}, \xi_2^{(n)}) - \xi_2'^{(n)}) g(\xi_2^{(n)}) + \ldots$$

where "p(x,y)" represents an arbitrary function which takes values in the interval from zero to one.

9. A computer graphics method as defined in claim 6 in which, in generating at least one estimator value as unprimed components $\xi_1^{(n)}, \ldots, \xi_L^{(n)}$, unprimed components of said low-discrepancy sequence $(\xi_1^{(n)}, \xi_1'^{(n)}, \xi_2^{(n)}, \xi_2'^{(n)}, \ldots, \xi_L^{(n)}, \xi_L'^{(n)})$ are processed in accordance with a selected transformation.

10. A computer graphics method as defined in claim 6 in which

A. $g(x) = L_e(\vec{x}, \vec{w})$, the radiance due to emission from the point $\vec{x}$ in the direction $\vec{w}$; and B. $K(x,y) = f(\vec{x}, \vec{w}' \to \vec{w}) G(\vec{x}, \vec{x}') V(\vec{x}, \vec{x}')$, where (i) function $f(\vec{x}, \vec{w}' \to \vec{w})$ is a bidirectional scattering distribution function which describes how much light coming from direction $\vec{w}'$ is reflected, refracted or otherwise scattered in a direction $\vec{w}$, and is generally the sum of a diffuse component, a glossy component and a specular component;

(ii) function $G(\vec{x}, \vec{x}')$ is a geometric term:

$$G(\vec{x}, \vec{x}') = \frac{\cos\theta \cos\theta'}{|\vec{x} - \vec{x}'|^2}, \quad (35)$$

where θ and θ' are angles relative to the normals of the respective surfaces at points $\vec{x}$ and $\vec{x}'$, respectively, and (iii) function $V(\vec{x}, \vec{x}')$ is a visibility function which equals the value one if the point $\vec{x}'$ is visible from the point $\vec{x}$ and zero if the point $\vec{x}'$ is not visible from the point $\vec{x}$.

* * * * *